United States Patent
Niederstadt et al.

[19]

[11] Patent Number: 6,145,633
[45] Date of Patent: Nov. 14, 2000

[54] ACTUATING DEVICE FOR MACHINE ELEMENTS THAT ARE SUBJECT TO WEAR PLAY, ESPECIALLY FOR BRAKES OF RAILBORNE VEHICLES

[75] Inventors: Jörg Niederstadt, Hemmingen/Devese; Axel Kemner, Isernhagen; Ralf Stoffels, Schwienau, all of Germany

[73] Assignee: Mannesmann AG, Düsseldorf, Germany

[21] Appl. No.: 09/098,793

[22] Filed: Jun. 17, 1998

[30] Foreign Application Priority Data

Jul. 30, 1997 [DE] Germany ............................ 197 34 540

[51] Int. Cl.⁷ .................................................. F16D 55/02
[52] U.S. Cl. ................... 188/71.8; 188/196 BA; 188/197; 188/203
[58] Field of Search ................... 185/71.8 OR, 185/71.9, 197, 202, 196 BA, 203, 196 B, 196 A, 196 C, 196 R, 198, 200, 71.7, 196 V

[56] References Cited

U.S. PATENT DOCUMENTS

| | | | |
|---|---|---|---|
| 696,524 | 4/1902 | Wahlert | 188/203 |
| 711,750 | 10/1902 | Wilson | 188/203 |
| 914,024 | 3/1909 | Dodson | 188/203 |
| 1,055,444 | 3/1913 | Cass | 188/203 |
| 1,120,640 | 12/1914 | Adreon | 188/203 |
| 3,132,532 | 5/1964 | Polanin | 188/197 |
| 4,570,506 | 2/1986 | Yamamoto et al. | 188/196 BA |
| 4,588,052 | 5/1986 | Courbot | 188/196 BA |
| 4,865,162 | 9/1989 | Morris et al. | 188/72.8 |
| 5,628,387 | 5/1997 | Schantzen | 188/71.9 |
| 5,915,504 | 6/1999 | Doricht | 188/71.8 |

FOREIGN PATENT DOCUMENTS

| | | |
|---|---|---|
| 17 46 90 | 5/1988 | European Pat. Off. . |
| 22 01 082 | 7/1972 | Germany . |

*Primary Examiner*—Robert J. Oberleitner
*Assistant Examiner*—Thomas J. Williams
*Attorney, Agent, or Firm*—Cohen, Pontani, Lieberman & Pavane

[57] ABSTRACT

An actuating device for machine elements that are subject to wear play, especially for brakes of railborne vehicles. The actuating device has a piston-cylinder unit operated by a pressure medium. The piston-cylinder unit has a piston rod engagable with an adjusting device configured as an adjusting nut/spindle assembly, for wear play compensation. The adjusting nut/spindle assembly has a sleeve-type adjusting nut with external toothing engagable with an automatically actuatable actuating drive. An electronic control unit generates an actuating signal for wear play compensation in dependence on the position of a brake piston connected to the piston rod. The brake piston position is measured by a sensor. The actuating signal is transmitted to the actuating drive.

12 Claims, 2 Drawing Sheets

ACTUATING DEVICE FOR MACHINE ELEMENTS THAT ARE SUBJECT TO WEAR PLAY, ESPECIALLY FOR BRAKES OF RAILBORNE VEHICLES

BACKGROUND OF THE INVENTION

1. Field of the Present Invention

The present invention relates to an actuating device for machine elements that are subject to wear play, and in particular, an actuating device for brakes of railborne vehicles.

2. Description of the Related Art

Clutches and brakes are machine elements subject to wear play. Machine elements of this kind are used for the transmission of driving forces and braking forces in railborne vehicles. Clutch facings and brake linings which withstand high thermal stresses and which enable desirable transmission of force are used for interrupting and stopping the transmission of force. These facings and linings are subject to wear which gradually causes increasing amount of play between the facings and linings. Adjusting devices are known in the art for compensating for this wear play.

EP 0 174 690, for example, discloses a generic adjusting device having an adjusting nut/spindle assembly which compensates for wear play in brakes. This adjusting device has a control sleeve which is acted upon by spring force so as to prevent, by means of a first coupling, an adjusting nut from performing a longitudinal displacement, and thus a readjustment, of the piston spindle through a rotating movement. After traveling a predetermined play path, the first coupling is disengaged by the displacement of a piston rod over a determined path, so that the adjustment of the play path can be increased corresponding to the amount of lining wear. A further forward movement of the piston engages a second coupling, whereupon the displacement of the adjusting nut on the spindle is halted. This mechanism for coupling and uncoupling the adjusting nut is disadvantageously complicated and expensive to manufacture. However, the use of the basic adjusting nut/spindle principle for adjustment is a quite robust solution which has proven successful in practice.

DE-OS 22 01 082 discloses a generic adjustment device for railborne vehicle brakes in connection with a piston-cylinder unit for brake actuation and with a brake linkage for transmission of braking force.

In the known generic adjusting devices, adjustment of the adjusting nut/spindle assembly for play compensation is only possible during load alternation by means of a coupling process which disadvantageously causes wear. Another problem with known adjusting devices is that there is a high consumption of compressed air due to the long cylinder strokes required for operating the adjusting mechanism.

SUMMARY OF THE INVENTION

Accordingly, it is an object of the present invention to provide an actuating device, and in particular an actuating device for brakes in railborne vehicles, having a simple, low-wear mechanism for adjusting wear play. A further object of the present invention is to provide an actuating device that only consumes a minimal amount of compressed air for operating the adjustment device under load.

The present invention includes an adjusting device configured as an adjusting nut/spindle assembly having a sleeve-type adjusting nut with external toothing, so as to engage an actuating drive. The actuating drive is automatically actuatable so as to urge the adjusting nut in at least one rotating direction. A brake piston is arranged within a piston-cylinder unit, the brake piston being connected to a piston rod, so as to be axially movable. A sensor determines the position of the piston rod. An electronic control unit generates an actuating signal for wear play compensation in dependence upon parameters relating to the sensed position of the piston rod. The actuating signal is then transmitted to the actuating drive. This simply constructed actuating device, in which an electronic control unit is used in place of a complex mechanism, is capable of performing the adjustment process even while under load. Since the movement of the brake piston is decoupled from the adjustment movement, less compressed air is consumed.

The actuating drive is preferably configured as a pressure-medium cylinder having a piston rod which engages the external toothing of the sleeve-type adjusting nut in the typical fashion of a snap-in pin. In this regard, in order to secure the adjusting nut in its toothing so as to prevent it from rotating back, a locking pawl is provided which is disengagable via a spring-loaded pull release. The use of this snap-in/push mechanism results in an actuating drive of simple construction which allows periodic adjustment of the adjusting nut in one rotating direction. Alternatively, the actuating drive can be configured as an electric motor, for example, as a stepper motor.

In order to enable a resetting of the adjusting nut, for example, when mounting new brake linings, the piston rod is held in the region of the toothing of the adjusting nut by a spring and a stop. Furthermore, the pressure-medium cylinder is mounted to a bearing so as to be swivelable out of the area of the toothing.

Another feature of the present invention is that the sensor can be constructed either as a digital end-position switch or as an analog magnetic-field switch. In the first case, the digital end-position switch enables a simple detection of the wear boundary or wear limit of the lining by giving off a binary signal. In the second case, an analog sensor, for example, the magnetic-field switch, determines the wear limit of the lining based on an analog measurement signal. In another embodiment of the present invention the amount of wear is determined by a separate path measurement device which measures the axial path of the sleeve-type adjusting nut. In its simplest form, this path measurement device comprises a slide resistor which is coupled axially to the adjusting nut.

Preferably, the adjusting nut has first and second coaxially extending, oppositely directed, internal thread portions. External thread portions arranged at the end of the piston rod and at the end of the brake linkage are engaged by the respective internal thread portions of the adjusting nut. The first internal thread portion is configured in the opposite direction to that of the second internal thread portion so that the piston rod is axially adjustable with respect to the brake linkage. As a result of this arrangement, a relatively large adjustment stroke can be achieved even with a small rotation of the adjusting nut. In a further embodiment of the present invention, the brake control unit receives a signal relating to the magnitude of the prevailing braking force dependent upon parameters relating to the pressure in the pressure-medium cylinder corresponding to the restoring torque at the adjusting nut.

In yet another embodiment of the present invention, the adjusting nut has only one internal thread portion. The one internal thread portion is engaged with either the external thread at the end of the piston rod or the external thread at end of the brake linkage. The end of the adjusting nut opposite from the internal thread portion is fastened to either the brake linkage or to the piston rod so as to be either fixed or rotatable and coaxial thereto.

As a feature of the present invention, the piston-cylinder unit contains an internal stop piston configured so as to function as an integrated auxiliary brake, the internal stop piston being acted upon on one side by a spring, as in a typical spring brake cylinder. As is known in the art, the stop piston is held by an unlocking unit, preferably a ball lock, for locking the stop piston in a neutral position. A pressure medium, via a shared pressure chamber, moves the stop piston into a neutral position in opposition to the spring force. The brake piston is arranged in the piston-cylinder unit adjacent to the stop piston to operate as a braking function. The brake piston is likewise acted upon by the pressure medium via the shared pressure chamber. As an actuating device for brakes, this arrangement of the stop piston and brake piston within a piston-cylinder unit makes it possible to perform an unlocking stroke of an auxiliary brake while the operating brake is engaged. This arrangement guarantees additional security when the brake is operated. The unlocking of the auxiliary brake is affected by the pressure-medium acting on a second integrated piston-cylinder unit. The auxiliary brake may also be unlocked manually by operation of a push rod or tappet which is accessible from the outside. Alternatively, electromagnetic unlocking is also possible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
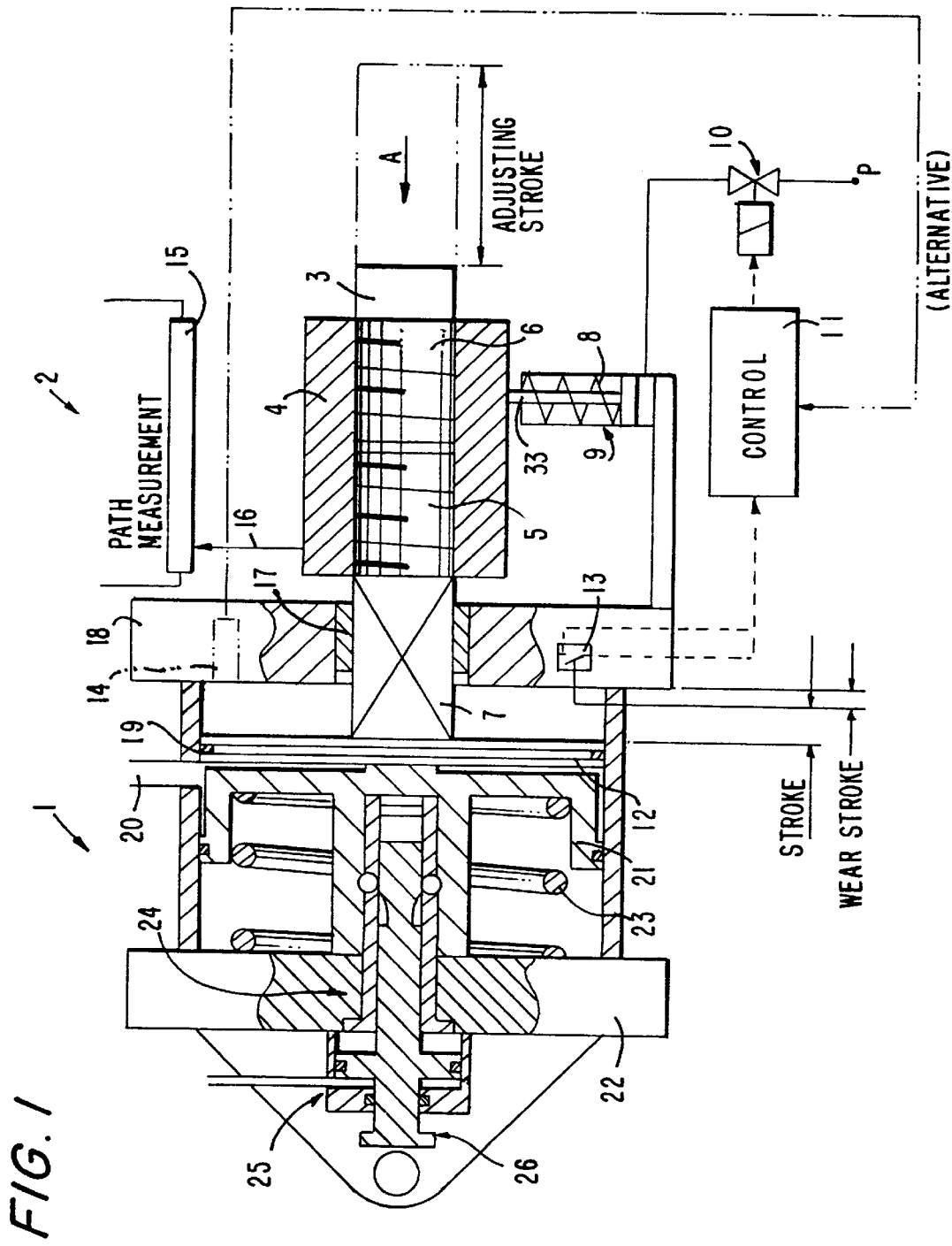
FIG. 1 is a partial sectional view of an actuating device for brakes in railborne vehicles.

As shown in FIG. 1, an actuating device for a brake includes a first piston-cylinder unit 1 which generates an actuating force, in communication with an adjusting device 2 which transmits the actuating force to a brake linkage 3. The adjusting device 2 has an adjusting nut 4 arranged therein, having two opposite-running internal thread portions 5, 6. The first of the two internal thread portions 5 is rotatably connected to a piston rod 7 having an external thread portion at one end, the piston rod 7 being arranged within the first piston-cylinder unit 1. The second of the two internal thread portions 6 rotatably engages the brake linkage 3 having an external thread portion at one end. Accordingly, a rotation of the adjusting nut 4 in a particular direction effectively lengthens the piston rod 7 so as to compensate for wear play. A brake piston 12 is arranged within the first piston-cylinder unit, and is connected to the piston rod 7.

A pressure-medium cylinder 9, being reset by a spring 8, is provided so as to operate as an actuating drive for adjustment of the adjusting nut 4. The pressure-medium cylinder 9 actuates a piston rod 33 arranged therein. The piston rod 33 is engagable with external toothing 27 configured on the outer surface of the adjusting nut 4. A sensor measures the position of the brake piston 12. A control unit 11 generates an actuating signal in dependence upon the sensor measurement. An electropneumatic directional control valve 10 then regulates the pressure supplied to the cylinder 9 in dependence upon the actuating signal. Adjustment stroke is fundamentally dependent on the stroke of the brake piston 12 and is preset as a parameter of the control unit 11. In one embodiment of the present invention, the sensor is a simple binary end-position switch 13 which switches upon contact with the brake piston 12. In another embodiment of the present invention the sensor is an analog signal transmitter, for example, a magnetic field transmitter 14. The magnetic field transmitter 14 advantageously senses actual state of wear of the lining, whereas the binary switch 13 senses boundary or threadhold wear state. The magnetic transmitter 14 therefore enables determination of the adjusting stroke threshold wear value. Furthermore, the actual wear state can be utilized to determine maintenance schedules. In yet another embodiment of the present invention a slide resistor 15 arranged parallel to the axis of the adjusting nut 4 measures an analog value for the adjustment nut 4 travel, thereby determining the wear state of the brake linings. For this purpose, the slide resistor 15 has a slide 16 connected to the adjusting nut 4 so as to be axially displaceable. The housing of the slide resistor 15 is arranged in a stationary manner relative thereto.

The first piston-cylinder unit 1, operable for actuating the brake, combines an auxiliary brake function with a service brake function. To function as a service brake the brake piston 12 is arranged so as to be movable longitudinally in a cylinder housing. The piston rod 7 extends orthogonally from the center of the brake piston 12, the piston rod 7 communicating with the adjusting nut 4 via a perforated cylinder cover 18 provided with a seal 17. A pressure chamber 19 is in communication with the brake piston 12 via a pressure-medium connection 20 arranged at the cylinder housing so as to produce brake actuation. The brake piston 12 is spring-reset via the brake linkage 3.

The auxiliary brake is configured as a spring brake cylinder having a stop piston 21 arranged opposite the brake piston 12. Pressurization of the pressure chamber 19 urges the stop piston 21 in one direction towards a cylinder cover 22, so as to reset the auxiliary brakes. A spring 23 is arranged between the cylinder cover 22 and the stop piston 21 so as to bias the stop piston 21 in the opposite direction towards the brake piston 12. In a neutral position, i.e., in the unactuated state, of the auxiliary brake shown in FIG. 1, the spring 23 is compressed. A ball-lock type unlocking unit 24 enables the release of the auxiliary brake. To release the auxiliary brake, an integrated second piston-cylinder unit 25 having a piston is in communication with the pressure medium, the second piston-cylinder unit 25 being arranged so that operation of the piston triggers the unlocking of the auxiliary brake. Alternatively, a tappet 26 is operated to manually actuate the unlocking of the auxiliary brake. When the force of the spring 23 urges the stop piston 21 towards the brake piston 12, the brake piston 12 in turn activates the brake, thereby releasing the auxiliary brake. In order to reset the auxiliary brake to the neutral position, the pressure chamber 19 is pressurized. In so doing, the brake piston 12 remains in the actuating position of the brake until the stop piston 21 of the auxiliary brake is locked again. The brake is released again when the pressure chamber 19 is subsequently vented.

Figure 2:
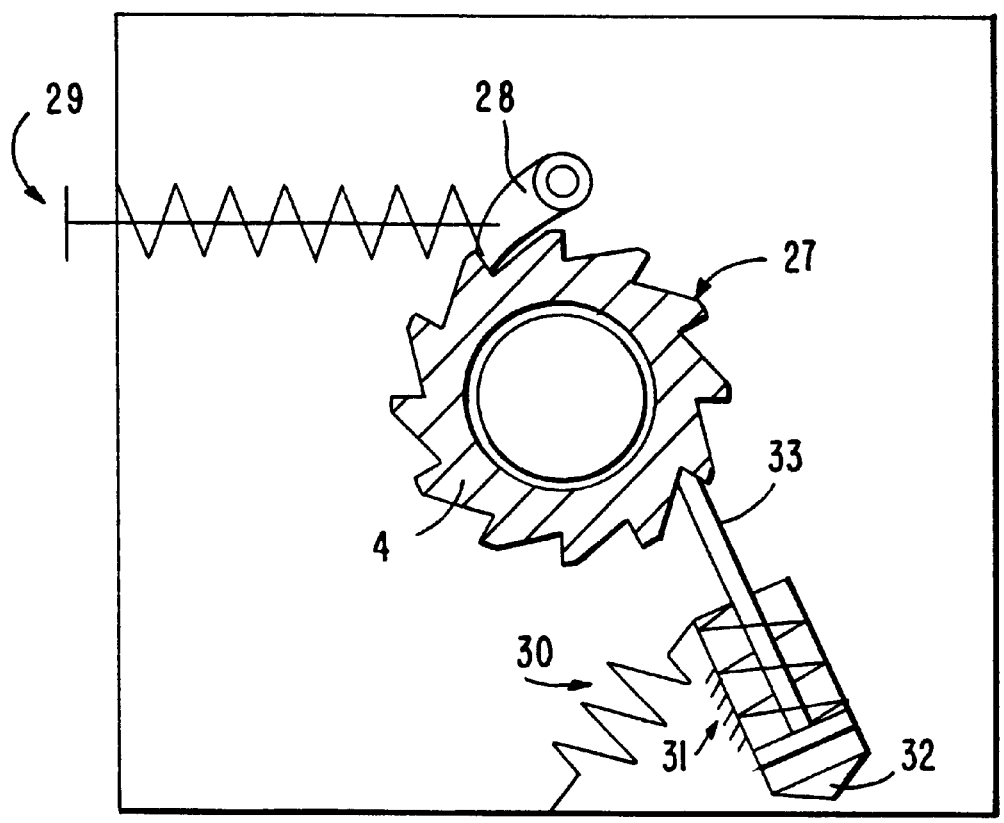
FIG. 2 is a view of the adjusting device of FIG. 1 in the direction indicated by the arrow A.

As shown in FIG. 2, the external toothing 27 of the adjusting nut 4 cooperates with the pressure-medium cylinder 9 as the actuating drive so that the stroke movement of the piston 33 of the pressure-medium cylinder 9 rotates the adjusting nut 4 thereby enabling periodic adjustment for wear play. A locking pawl 28 engages the external toothing, for securing the adjusting nut 4. Operation of a spring-loaded pull release 29 manually unlocks the locking pawl 28 so that, for example, when changing linings, the adjusted wear play path can be restored. A spring 30 biases the pressure-medium cylinder 9 to be held in connection with a stop 31 arranged in the area of the toothing 27, the cylinder 9 being rotatable about a bearing 32 so as to be swivelable away from the toothing 27.

The actuating device of the present invention makes it relatively simple to transition from a purely mechanical wear play adjustment to a wear play adjustment using electronic components to enable the actuating device. Furthermore, the activating device of the present invention is simpler to construct and consumes less compressed air than typical actuating devices.

We claim:

1. An actuating device for machine elements subject to wear play, comprising:
    an adjusting device configured as an adjusting nut/spindle assembly adjustable so as to compensate for wear play, the adjusting nut/spindle assembly including a sleeve-type adjusting nut having a toothing;
    a piston-cylinder unit having an axially movable piston rod arranged therein, the piston rod being connected with the adjusting device;
    automatically actuatable actuating drive means for engaging the toothing of the adjusting nut and means for rotating the adjusting nut, the actuating drive means including a pressure-medium cylinder having a piston rod arranged therein so as to directly engage in the toothing;
    a brake piston arranged within the piston cylinder unit, the brake piston being connected to the piston rod so as to axially move the piston rod;
    sensor means for measuring axial position of the piston rod and providing a corresponding input signal;
    an electronic control unit in electrical communication with the sensor so as to receive the input signal, the electronic control unit generating an actuating signal as a function of the input signal, the actuating signal being transmitted to the actuating drive means so as to operate the actuating drive means to compensate for wear play;
    a locking pawl at a distance from the piston rod of the pressure-medium cylinder and engagable with the adjusting nut toothing so as to permit the adjusting nut to rotate in only one direction;
    spring-loaded pull-release means for disengaging the locking pawl from the adjusting nut toothing; and
    a spring and a stop arranged to hold the pressure medium cylinder piston rod in the region of the adjusting nut toothing, the pressure medium cylinder being rotatably mounted around a bearing so as to be swivelable away from the region of the adjusting nut toothing against force of the spring so as to enable resetting of the adjusting nut.

2. The actuating device according to claim 1, wherein the sensor means includes a digital end position switch.

3. The actuating device according to claim 1, wherein the sensor means includes an analog magnetic-field transmitter.

4. The actuating device according to claim 1, further comprising a brake linkage, the adjusting nut having one coaxially extending internal thread portion proximal one end thereof, the piston rod having an external thread portion arranged at one end thereof, the adjusting nut internal thread portion engaging the piston rod external thread portion, an end of the adjustment nut opposite the internal thread portion end being fastened to the brake linkage.

5. The actuating device according to claim 1, further comprising a brake linkage, the adjusting nut having one coaxially extending internal thread portion proximal one end thereof, the brake linkage having an external thread portion arranged at one end thereof, the adjustment nut internal thread portion engaging the brake linkage external thread portion, an end of the adjusting nut opposite the internal thread portion end being fastened to the piston rod.

6. An actuating device for machine elements subject to wear play, comprising:
    an adjusting device configured as an adjusting nut/spindle assembly adjustable so as to compensate for wear play, the adjusting nut/spindle assembly including a sleeve-type adjusting nut having a toothing;
    a piston-cylinder unit having an axially movable piston rod arranged therein, the piston rod being connected with the adjusting device;
    automatically actuatable actuating drive means for engaging the toothing of the adjusting nut and means for rotating the adjusting nut;
    a brake piston arranged within the piston cylinder unit, the brake piston being connected to the piston rod so as to axially move the piston rod;
    sensor means for measuring axial position of the piston rod and providing a corresponding input signal;
    an electronic control unit in electrical communication with the sensor so as to receive the input signal, the electronic control unit generating an actuating signal as a function of the input signal, the actuating signal being transmitted to the actuating drive means so as to operate the actuating drive means to compensate for wear play; and
    path measurement means for measuring the axial position of the sleeve type adjusting nut so as to determine an amount of wear play.

7. The actuating device according to claim 6, wherein the path measurement means is a slide resistor.

8. An actuating device for machine elements subject to wear play, comprising:
    an adjusting device configured as an adjusting nut/spindle assembly adjustable so as to compensate for wear play, the adjusting nut/spindle assembly including a sleeve-type adjusting nut having a toothing;
    a piston-cylinder unit having an axially movable piston rod arranged therein, the piston rod being connected with the adjusting device;
    automatically actuatable actuating drive means for engaging the toothing of the adjusting nut and means for rotating the adjusting nut;
    a brake piston arranged within the piston cylinder unit, the brake piston being connected to the piston rod so as to axially move the piston rod;
    sensor means for measuring axial position of the piston rod and providing a corresponding input signal;
    an electronic control unit in electrical communication with the sensor so as to receive the input signal, the electronic control unit generating an actuating signal as a function of the input signal, the actuating signal being transmitted to the actuating drive means so as to operate the actuating drive means to compensate for wear play; and a brake linkage having an external thread portion arranged at one end, the piston rod having an external thread portion arranged at one end, the adjusting nut having two coaxially extending oppositely directed internal thread portions, the internal thread portions respectively engage in the piston rod external thread portion and the brake linkage external thread portion whereby the piston rod and brake linkage are axially adjustable with respect to one another by rotation of the adjusting nut.

9. An actuating device for machine elements subject to wear play, comprising:

an adjusting device configured as an adjusting nut/spindle assembly adjustable so as to compensate for wear play, the adjusting nut/spindle assembly including a sleeve-type adjusting nut having a toothing;

a piston-cylinder unit having an axially movable piston rod arranged therein, the piston rod being connected with the adjusting device;

automatically actuatable actuating drive means for engaging the toothing of the adjusting nut and means for rotating the adjusting nut;

a brake piston arranged within the piston cylinder unit, the brake piston being connected to the piston rod so as to axially move the piston rod;

sensor means for measuring axial position of the piston rod and providing a corresponding input signal; and an electronic control unit in electrical communication with the sensor so as to receive the input signal, the electronic control unit generating an actuating signal as a function of the input signal, the actuating signal being transmitted to the actuating drive means so as to operate the actuating drive means to compensate for wear play, the piston cylinder unit including:

a stop piston operative as an auxiliary brake; a spring arranged within the piston cylinder unit so as to operate as a spring brake cylinder, the spring having a first end and a second end, the first end being in contact with the stop piston so as to bias the stop piston toward the brake piston; and unlocking means arranged proximal the second end of the spring for locking the stop piston into a neutral position, the brake piston being arranged within the piston cylinder unit, coaxial and adjacent to the stop piston so as to operate as a service brake, the piston cylinder unit having a pressure chamber in fluid communication with the stop piston so that a pressure medium urges the stop piston in a direction away from the brake piston, towards the neutral position, the pressure chamber being concurrently in fluid communication with the brake piston so that the pressure medium urges the brake piston in a direction away from the stop piston.

10. The actuating device according to claim 9, wherein the unlocking means includes a ball lock.

11. The actuating device according to claim 10, further comprising an integrated second piston cylinder unit actuatable by the pressure medium so as to operate the unlocking means.

12. The actuating device according to claim 10, further comprising a tappet manually actuatable so as to operate the unlocking means.

* * * * *